(12) United States Patent
Michishita

(10) Patent No.: US 9,134,785 B2
(45) Date of Patent: Sep. 15, 2015

(54) INFORMATION PROCESSING APPARATUS WITH POWER SAVING MODE, AND CONTROL METHOD AND COMMUNICATION APPARATUS THEREFOR

(75) Inventor: Takumi Michishita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 668 days.

(21) Appl. No.: 13/309,723

(22) Filed: Dec. 2, 2011

(65) Prior Publication Data

US 2012/0191989 A1 Jul. 26, 2012

(30) Foreign Application Priority Data

Jan. 24, 2011 (JP) ................................. 2011-012239

(51) Int. Cl.
G06F 1/32 (2006.01)
G06F 1/26 (2006.01)

(52) U.S. Cl.
CPC ................ G06F 1/3209 (2013.01); G06F 1/32 (2013.01); G06F 1/3203 (2013.01); G06F 1/325 (2013.01); G06F 1/3206 (2013.01); G06F 1/329 (2013.01); G06F 1/3234 (2013.01); G06F 1/3243 (2013.01); G06F 1/3284 (2013.01); G06F 1/3287 (2013.01); G06F 1/3293 (2013.01); *Y02B 60/1282* (2013.01); *Y02B 60/30* (2013.01); *Y02B 60/32* (2013.01)

(58) Field of Classification Search
None
See application file for complete search history.

(56) References Cited

U.S. PATENT DOCUMENTS

| 8,176,348 | B2 * | 5/2012 | Fukuda | 713/323 |
|---|---|---|---|---|
| 2009/0164816 | A1 * | 6/2009 | Yasuda | 713/320 |
| 2011/0292975 | A1 * | 12/2011 | Kuwahara | 375/219 |
| 2011/0302436 | A1 * | 12/2011 | Clark et al. | 713/323 |
| 2012/0191926 | A1 * | 7/2012 | Higashi | 711/154 |
| 2012/0191989 | A1 * | 7/2012 | Michishita | 713/300 |
| 2013/0163616 | A1 * | 6/2013 | Niitsuma | 370/468 |

FOREIGN PATENT DOCUMENTS

| JP | 2008-181436 A | 8/2008 |
|---|---|---|
| JP | 2009-151537 A | 7/2009 |

* cited by examiner

*Primary Examiner* — Tanh Nguyen
(74) *Attorney, Agent, or Firm* — Fitzpatrick, Cella, Harper & Scinto

(57) ABSTRACT

An information processing apparatus capable of suppressing occurrence of a failure in the processing to respond to reception information received from external equipment. In a normal power mode, a CPU of a main controller executes processing to respond to incoming packets, thereby generating response packets. In a power saving mode, a microprocessor of a LAN interface executes processing to respond to incoming packets to generate response packets. During return processing for return from power saving mode to normal power mode, the LAN interface transfers an incoming packet to the main controller and to the microprocessor of the LAN interface.

5 Claims, 8 Drawing Sheets

INFORMATION PROCESSING APPARATUS WITH POWER SAVING MODE, AND CONTROL METHOD AND COMMUNICATION APPARATUS THEREFOR

BACKGROUND OF THE INVENTION

1. Field of the Invention

The present invention relates to an information processing apparatus with power saving mode, and a control method and a communication apparatus therefor.

2. Description of the Related Art

An information processing apparatus with power saving mode is known (see, for example, Japanese Laid-open Patent Publications Nos. 2009-151537 and 2008-181436).

A data processing apparatus disclosed in Japanese Laid-open Patent Publication No. 2009-151537 (corresponding to U.S. Patent Application Publication No. 20090164816 A1) has a main CPU and a sub CPU. In the power saving mode, the main CPU is supplied with no power or supplied with reduced power as compared to that in a normal power mode, and the sub CPU responds to incoming packets received through a network.

However, it is difficult for the sub CPU to respond to all the incoming packets since the sub CPU runs at a reduced clock rate in the power saving mode. Thus, after return to the normal power mode from the power saving mode, the main CPU responds to packets to which the sub CPU could not respond.

Generally, however, it takes a slight time for the main CPU to completely function in the normal power mode from start of power supply to the main CPU. In other words, there is idle time until the main CPU returns to the normal power mode from the power saving mode.

If packets are supplied to the data processing apparatus through the network during the idle time, a packet reception failure can occur.

To eliminate such a problem, the information processing apparatus disclosed in Japanese Laid-open Patent Publication No. 2008-181436 stores, into a memory, packets received through the network while the main CPU is being changed from the power saving mode to the normal power mode, thereby preventing a packet reception failure from occurring while the power saving mode is being returned to the normal power mode.

However, responses to incoming packets cannot be made during the idle time until the main CPU becomes able to completely function in the normal power mode.

SUMMARY OF THE INVENTION

The present invention provides an information processing apparatus capable of suppressing occurrence of a failure in the processing to respond to reception information received from external equipment, and provides a control method and a communication apparatus for the information processing apparatus.

According to one aspect of this invention, there is provided an information processing apparatus that generates and transmits response information in response to reception information received from external equipment, which comprises a first generation unit configured to generate the response information in response to the reception information, a second generation unit configured to, in a case where the first generation unit is in a power saving state incapable of generating the response information, generate the response information in response to the reception information, and a transfer control unit configured to transfer the reception information to both the first and second generation units when the first generation unit is being shifted from the power saving state to a state capable of generating the response information, wherein the first generation unit does not generate the response information to the reception information, among the reception information transferred to the first generation unit by the transfer control unit, which has been transferred to the second generation unit by the transfer control unit and to which the response information has been generated by the second generation unit.

With this invention, it is possible to suppress occurrence of a failure in the processing to respond to reception information received from external equipment.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1:
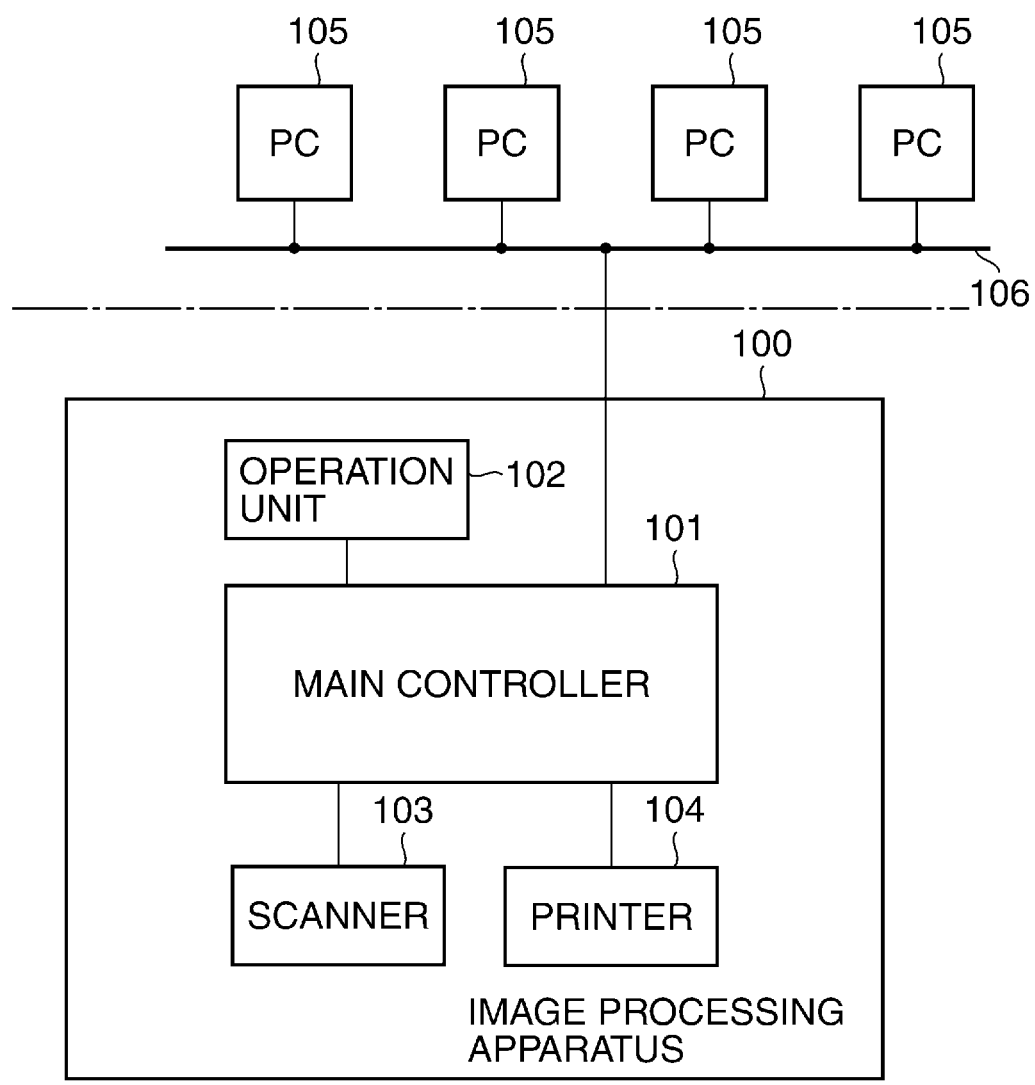
FIG. 1 is a block diagram showing an image processing apparatus, which is an information processing apparatus according to one embodiment of this invention, and external equipment that is network-connected to the image processing apparatus.

FIG. 1 shows in block diagram an image processing apparatus, which is an information processing apparatus according to one embodiment of this invention, and external equipment that is network-connected to the image processing apparatus. It should be noted that this invention is also applicable to an information processing apparatus other than the image processing apparatus.

Referring to FIG. 1, the image processing apparatus 100 is implemented by, e.g., a multi-function peripheral (MFP) that performs image input and output, image transmission and reception, and various image processing. The image processing apparatus 100 is capable of communicating through an image network 106 (e.g., LAN) with personal computers (PCs) 105, which are external equipment.

The image processing apparatus 100 includes a scanner 103 which is an image input device, a printer 104 which is an image output device, a main controller 101 connected to the LAN 106, and an operation unit 102 which is a user interface. The main controller 101 functions as a control apparatus of the image processing apparatus 100 (information processing apparatus). The scanner 103, the printer 104, and the operation unit 102 are connected to the main controller 101 and controlled according to instructions from the main controller 101.

Figure 2:
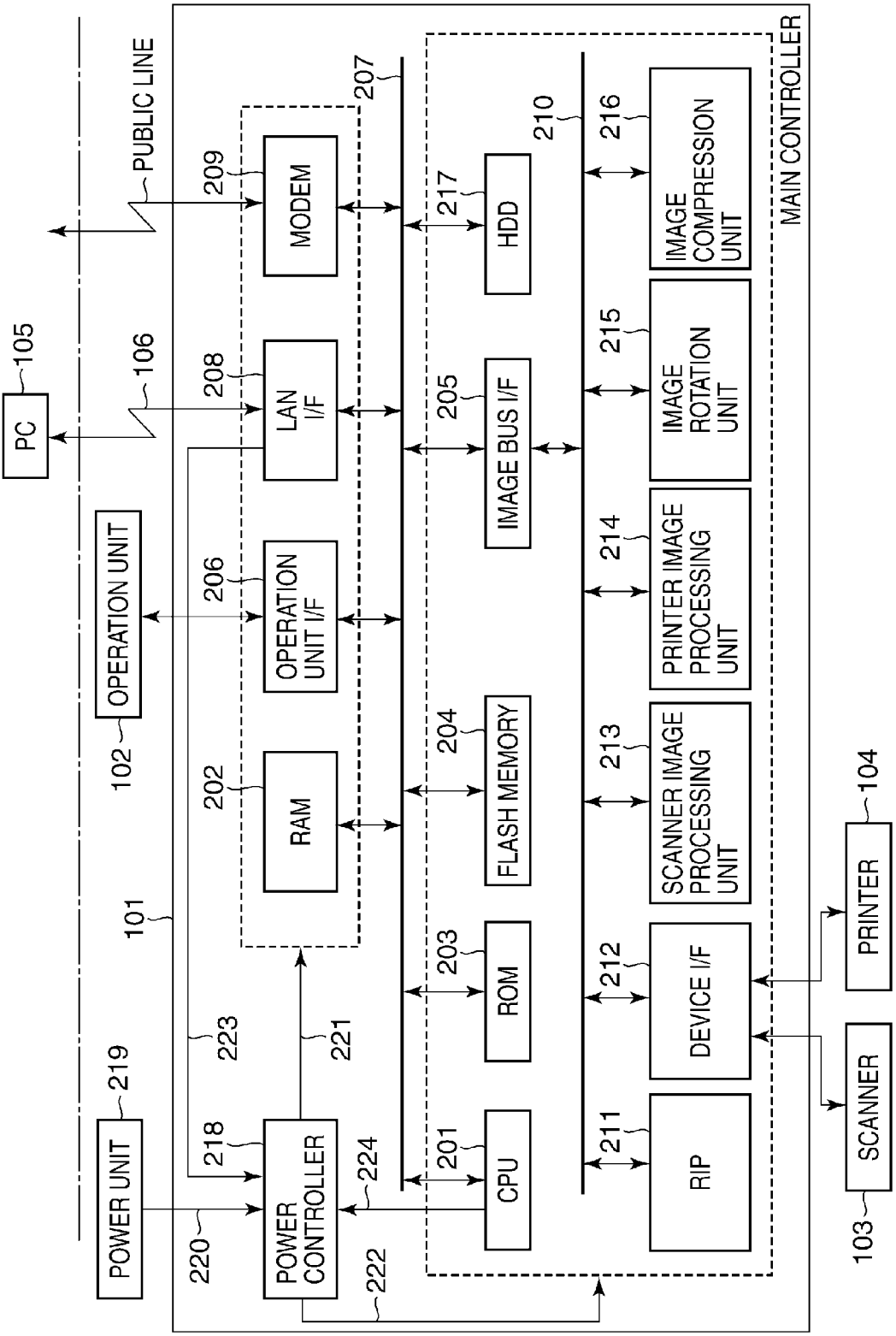
FIG. 2 is a block diagram showing in detail the construction of a main controller of the image processing apparatus.

FIG. 2 shows the construction of the main controller 101 in detail in block diagram.

As shown in FIG. 2, the main controller 101 is connected to a public line as well as to the LAN 106. A power unit 219 is connected to the main controller 101.

The main controller 101 includes a CPU 201 (first control unit), which is connected through a system bus 207 to a RAM 202, ROM 203, flash memory 204, image bus interface (I/F) 205, operation unit I/F 206, LAN I/F 208, modem 209, and hard disk drive (HDD) 217.

The RAM 202 (first storage unit or first memory) is a memory that provides a work area for the CPU 201 and also used as an image memory for temporary storage of image data.

The ROM 203 is a boot ROM in which a boot program is stored. System software, setting value data, etc. are stored in the flash memory 204.

The operation unit I/F 206 is an interface with the operation unit 102 for input and output. The operation unit I/F 206 outputs to the operation unit 102 image data to be displayed thereon, and transmits to the CPU 201 information input by a user through the operation unit 102.

The LAN I/F 208 is connected to the LAN 106, and inputs and outputs information to and from the LAN 106. The LAN I/F 208 functions as a communication apparatus of the image processing apparatus 100 (information processing apparatus). The modem 209 is connected to the public line, and inputs and outputs information to and from the public line.

The image bus I/F 205 is a bus bridge for data structure conversion, through which the system bus 207 is connected to an image bus 210 that transfers image data at high speed.

Connected to the image bus 210 are a RIP (raster image processor) 211, device I/F 212, scanner image processing unit 213, printer image processing unit 214, image rotation unit 215, and image compression unit 216.

The RIP 211 develops a PDL code received through the LAN 106 into a bitmap image. The device I/F 212, through which the scanner 103 and the printer 104 are connected to the main controller 101, performs synchronous/asynchronous conversion of image data. The scanner image processing unit 213 performs correction, modification, and editing on input image data.

The printer image processing unit 214 performs printer correction, resolution conversion, etc. on print-output image data. The image rotation unit 215 performs rotation of image data. The image compression unit 216 carries out compression of multi-valued image data into JPEG data and decompression thereof, compression of binary image data into JBIG, MMR, MH or other data, and decompression thereof.

The HDD 217, which is detachably mounted on the main controller 101, stores image data, address book data, job logs, individual user's data (preference data) such as favorites and shortcuts, etc. If the HDD 217 is not connected to the system bus 207, various data described above are stored into the flash memory 204.

The main controller 101 has a power controller 218 that is supplied with DC power from a power unit 219 through a power supply line 220 and that supplies power to circuit elements of the main controller 101 through power supply lines 221, 222.

Based on a control signal received from the LAN I/F 208 through a control signal line 223 and a control signal received from the CPU 201 through a control signal line 224, the power controller 218 is controlled to selectively turn on and off each of the power supply lines 221 and 222, whereby the power mode of the image processing apparatus 100 is switched between normal power mode and power saving mode.

The power supply line 221 is connected to the CPU 201, ROM 203, flash memory 204, image bus I/F 205, HDD 217, RIP 211, device I/F 212, scanner image processing unit 213, printer image processing unit 214, image rotation unit 215, and image compression unit 216. The power supply line 222 is connected to the RAM 202, operation unit I/F 206, LAN I/F 208, and modem 209.

As described above, the image processing apparatus 100 has the power saving mode (power saving state) and the normal power mode. In the normal power mode, the power controller 218 is controlled such that the power supply lines 221, 222 are turned on. Thus, power supplied from the power unit 219 to the power controller 218 through the power supply line 220 is supplied through the power supply line 222 to primary circuit elements such as the CPU 201 and is also supplied through the power supply line 221 to circuit elements such as the LAN I/F 208.

On the other hand, in the power saving mode (power saving state), the power controller 218 is controlled such that the power supply line 222 is turned off and the power supply line 221 is turned on. Thus, power supplied from the power unit 219 to the power controller 218 is supplied through the power supply line 221 to the circuit elements such as the LAN I/F 208, whereas power supply to the primary circuit elements including the CPU 201 through the power supply line 222 is disconnected, thereby largely decreasing power consumption by the image processing apparatus 100. In other words, power consumption becomes smaller in the power saving mode than in at least the normal power mode.

When receiving data for a print job or the like from, e.g., the PC 105, the LAN I/F 208 controls the power controller 218 such that the power mode is returned to the normal power mode.

In the above-described example, power supply to the CPU 201 is disconnected in the power saving mode, but this is not limitative. For example, power supply to the CPU 201 can be made smaller in the power saving mode than in the normal power mode. In that case, processing that can be executed by the CPU 201 is more limited in the power saving mode than in the normal power mode. As the processing limited in the power saving mode, at least there can be mentioned processing on data received by the LAN I/F 208 from the PC 105 or the like.

In the power saving mode, the RAM 202 is supplied with power from the power unit 219, and performs a self-refresh operation to back up the system program. The RAM 202 is capable of directly inputting and outputting data to and from the LAN I/F 208 by means of DMA (direct memory access) transfer, without intervention of the CPU 201.

Figure 3:
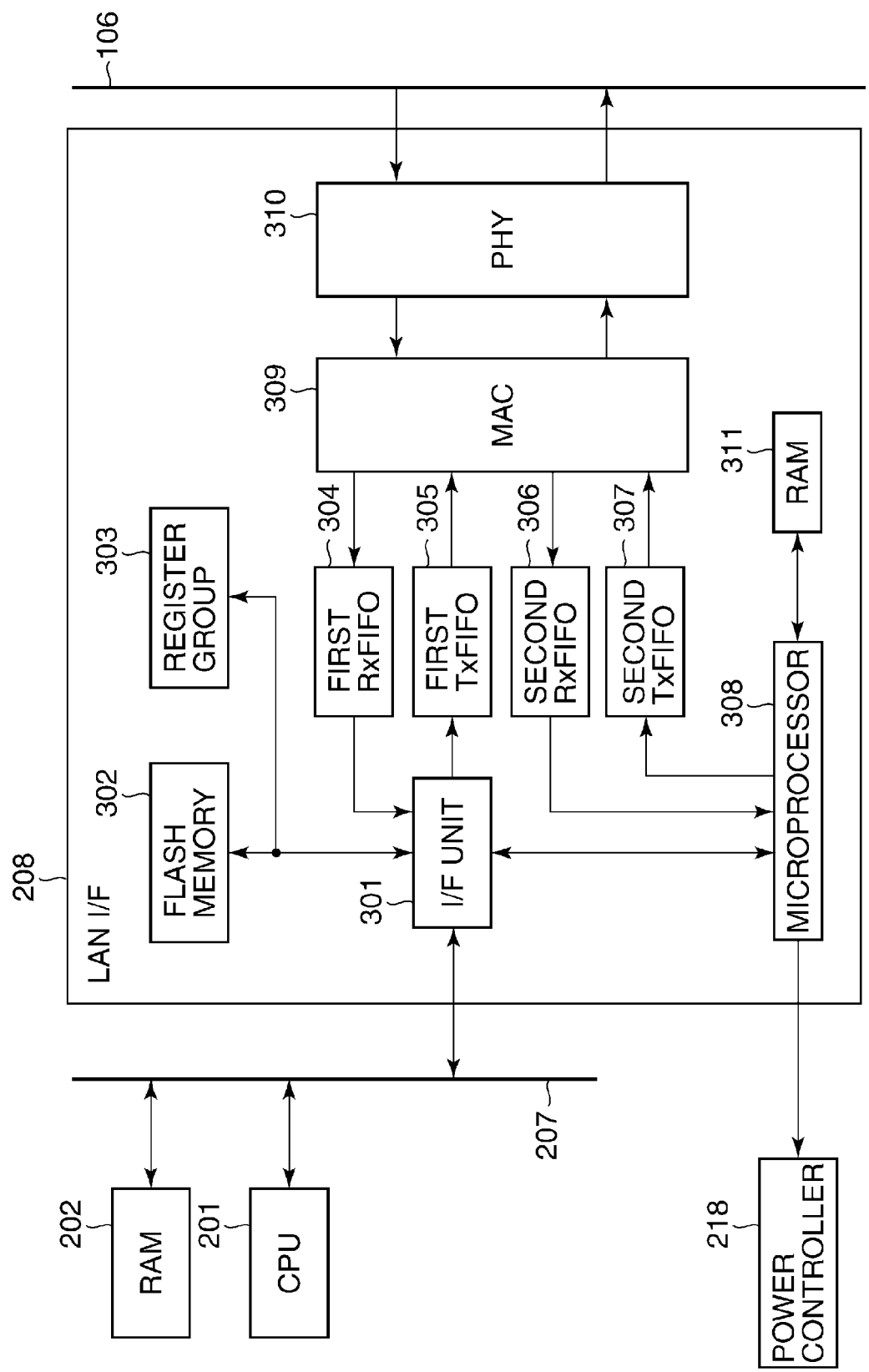
FIG. 3 is a block diagram showing in detail a LAN I/F of the main controller.

FIG. 3 shows the LAN I/F 208 in detail in block diagram.

Referring to FIG. 3, the LAN I/F 208 includes an I/F unit 301 through which the LAN I/F 208 is connected to the system bus 207, a flash memory 302 (which is a non-volatile memory) for inputting and outputting information to and from the CPU 201 through the I/F unit 301, a register group 303 for reflecting the status of the LAN I/F 208 controlled by the CPU 201. The LAN I/F 208 further includes a first first-in first-out reception memory (first RxFIFO) 304, a first-in first-out transmission memory (first TxFIFO) 305, a second first-in first-out reception memory (second RxFIFO) 306 as a second storage unit or second memory, and a second first-in first-out transmission memory (second TxFIFO) 307.

Furthermore, the LAN I/F 208 includes a microprocessor 308 (second control unit), a MAC (media access controller or network packet reception unit) 309, a physical layer (PHY) 310 connected to the LAN 106, and a RAM 311 (second storage unit or second memory) that provides a shared memory area of the LAN I/F 208 for storage of data and programs. The capacity of the RAM 311 is limited by the structure of the LAN I/F 208.

In the case of receiving an incoming packet (reception information) in the normal power mode, the MAC 309 receives the incoming packet from the LAN 106 through the physical layer (PHY) 310, and sets the incoming packet into the first RxFIFO 304. The incoming packet set in the first RxFIFO 304 is sent through the I/F unit 301 to the RAM 202 of the main controller 101.

In the case of transmitting a response packet in the normal power mode, the response packet to be transmitted is set into the first TxFIFO 305 from the CPU 201 through the I/F unit 301. The MAC 309 delivers the response packet from the first TxFIFO 305 to the PHY 310, and the PHY 301 transmits the response packet to the LAN 106.

In the case of receiving an incoming packet in the power saving mode, the MAC 309 receives the incoming packet from the LAN 106 through the PHY 310, and sets the incoming packet into the second RxFIFO 306. The microprocessor 308 determines whether or not a response can be made to the incoming packet while maintaining the power saving mode.

When determining that the response can be made to the incoming packet while maintaining the power saving mode, the microprocessor 308 generates a response packet (response information) in response to the incoming packet, and sets the response packet in the second TxFIFO 307. The response packet set in the second TxFIFO 307 is transmitted by the MAC 309 to the LAN 106 through the PHY 310.

On the other hand, when determining that the response to the incoming packet cannot be made while maintaining the power saving mode, the microprocessor 308 notifies the power controller 218 through the control signal line 223 that a shift to the normal power mode is to be made, whereby the response to the incoming packet is performed by hardware resource of the main controller 101, as will be described later.

In the following, a description will be given of processing performed by the main controller 101 from start to completion of return from the power saving mode to the normal power mode.

Figure 4:
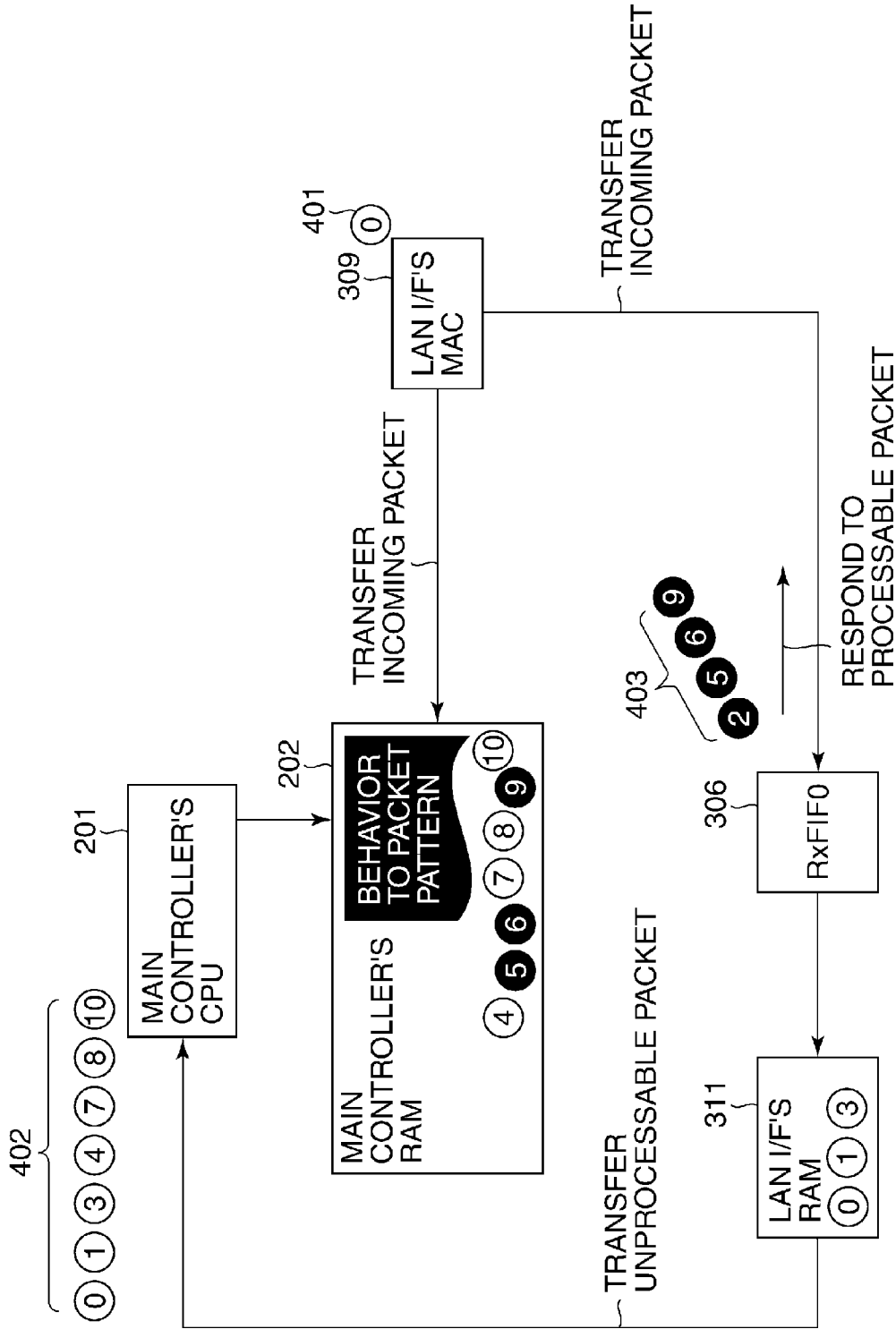
FIG. 4 is a view showing control performed by the main controller on incoming packets from start to completion of return from a power saving mode to a normal power mode.

FIG. 4 shows control performed by the main controller 101 on incoming packets from start to completion of return from the power saving mode to the normal power mode.

In FIG. 4, reference numeral 401 denotes a packet to which the microprocessor 308 cannot respond while maintaining the power saving mode (hereinafter, referred to as the return factor packet). The return factor packet is represented by a white circle mark with digit "0" in FIG. 4. If the incoming packet is the return factor packet (predetermined return factor information), the main controller 101 performs return processing from the power saving mode to the normal power mode.

Reference numeral 402 denotes packets to which the LAN I/F 208 cannot respond (hereinafter, referred to as the unprocessable packets) among packets received by the MAC 309 of the LAN I/F 208 until the main controller 101 returns to the normal power mode. The unprocessable packets are represented by white circle marks with digits 1, 3, 4, 7, 8, and 10 in FIG. 4. Reference numeral 403 denotes packets to which the LAN I/F 208 can respond (hereinafter, referred to as the processable packets) among packets received by the MAC 309 until the main controller 101 returns to the normal power mode. The processable packets are represented by black circle marks with digits 2, 5, 6, and 9. The LAN I/F 208 is capable of responding to the processable packets 403, even while the main controller 101 is returning to the normal power mode.

Figure 5:
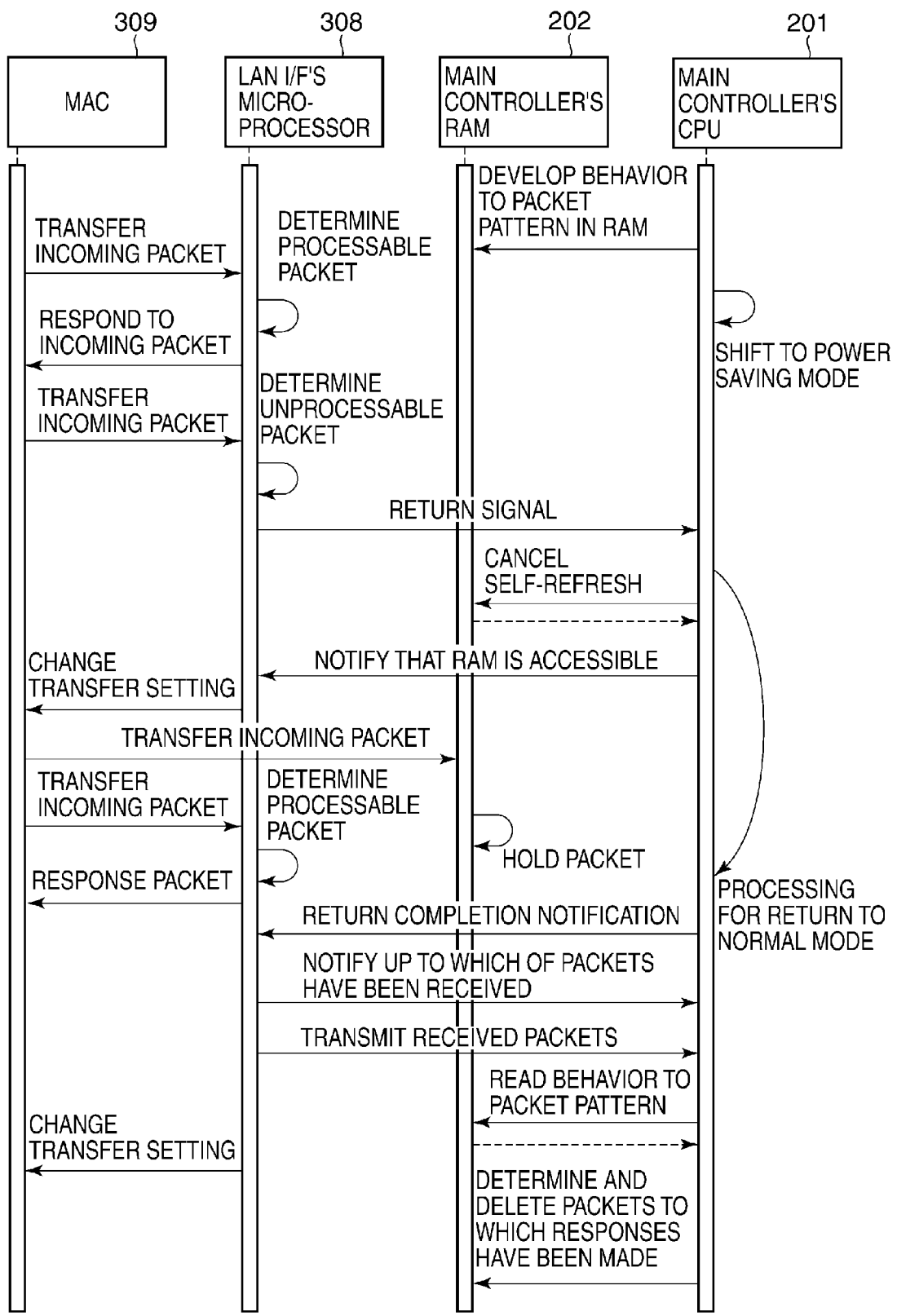
FIG. 5 is a view showing a sequence of process performed by the main controller from when a shift to the power saving mode is made to after the return from the power saving mode to the normal power mode is complete.
Figure 6:
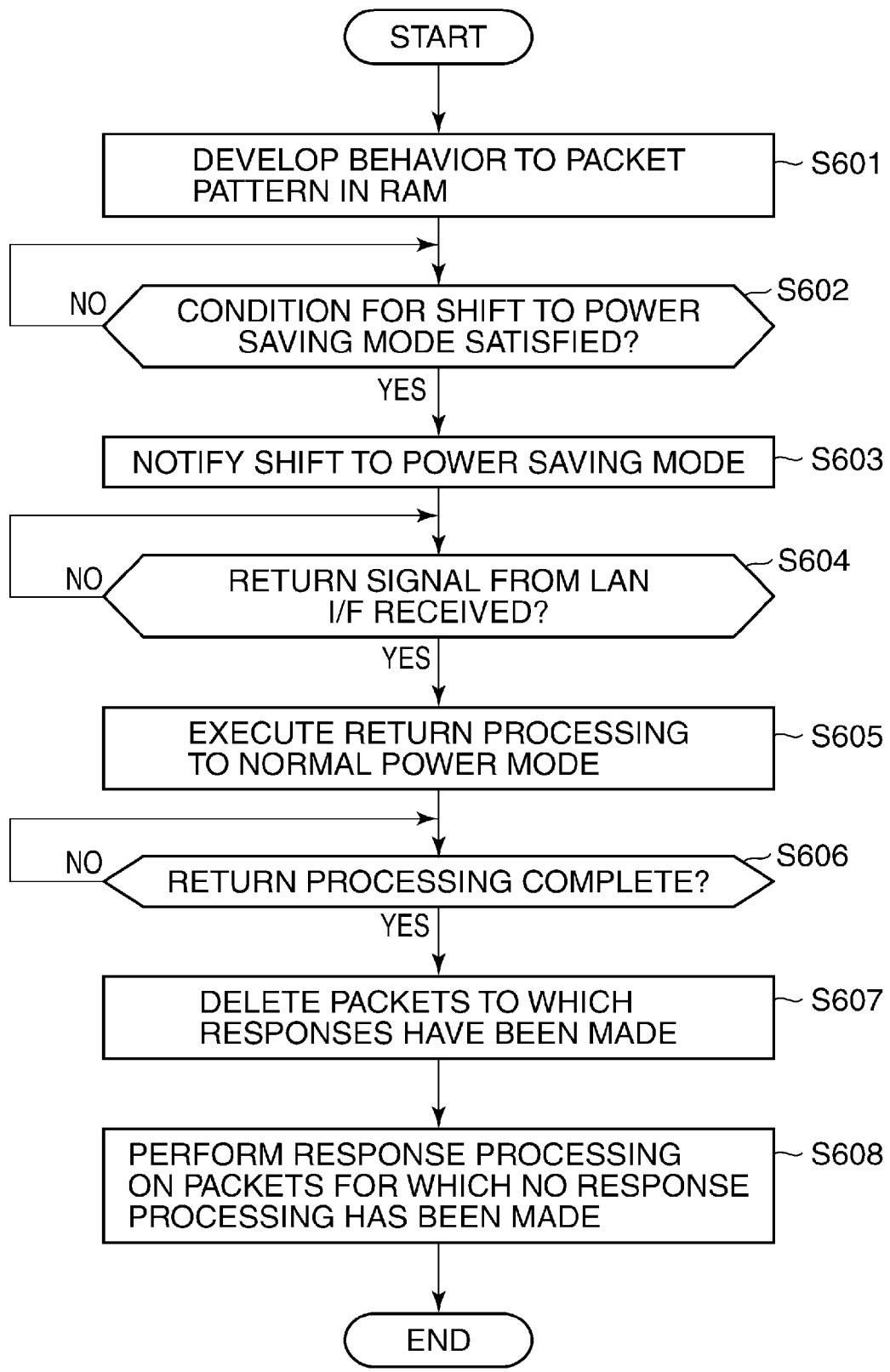
FIG. 6 is a flowchart showing operation of a CPU of the main controller performed from when the shift to the power saving mode is made to when the power saving mode is returned to the normal power mode.

FIG. 5 shows a sequence of process performed by the main controller 101 from when a shift to the power saving mode is made to after the return from the power saving mode to the normal power mode is completed. FIG. 6 shows, in flowchart, operation of the CPU 201 of the main controller 101 performed from when the shift to the power saving mode is made to when the power saving mode is returned to the normal power mode in the process sequence of FIG. 5.

Referring to FIG. 6, when the main controller 101 is activated, a behavior to packet pattern (hereinafter, also referred to as the packet determination condition) is developed in the RAM 202 by the CPU 201 of the main controller 101 (step S601). The packet determination condition is for determining processable packets (shown at 403 in FIG. 4) to which the LAN I/F 208 can respond and unprocessable packets (shown at 402 in FIG. 4) to which the LAN I/F 208 cannot respond. For example, the packet determination condition represents a pattern of processable packets and a pattern of unprocessable packets. By developing the behavior to packet pattern (packet determination condition) in the RAM 202, processable packets and unprocessable packets can be determined at a higher speed than in the case of accessing the HDD 217 when the power mode is returned to the normal power mode.

Next, the CPU 201 determines whether or not a condition for shift to the power saving mode is satisfied (step S602). If the answer to step S602 is NO, the CPU 201 again determines in step S602 whether the condition for shift to the power saving mode is satisfied. If the condition for shift to the power saving mode is satisfied (i.e., if YES to step S602), the CPU 201 shifts to the power saving mode and notifies the LAN I/F 208 that a shift to the power saving mode is to be made (step S603). In response to this notification, the microprocessor 308 of the LAN I/F 208 controls the power controller 218 to make a shift to the power saving mode, and switches the transfer setting of the MAC 309 to a first transfer setting (described later).

Next, the CPU 201 determines whether or not it receives a return signal from the microprocessor 308 of the LAN I/F 208 (step S604). If the answer to step S604 is NO, the CPU 201 again performs the determination in step S604. In other words, the power saving mode is continued until the CPU 201 receives the return signal.

When the CPU 201 determines in step S604 that it receives the return signal from the microprocessor 308, the CPU 201 executes return processing (see, FIG. 5) from the power saving mode to the normal power mode (step S605). It should be noted that it takes several seconds from the start of the return processing for the main controller 101 to completely return from the power saving mode to the normal power mode.

Next, the CPU 201 determines whether or not the return processing is complete (step S606). If the answer to step S606 is NO, the CPU 201 waits for the return processing being complete. If the return processing is complete (i.e., if YES to step S606), the CPU 201 sends a return completion notification to the LAN I/F 208. Based on the packet determination condition developed in the RAM 202, the CPU 201 determines and deletes incoming packets to which responses have been made by the microprocessor 308 of the LAN I/F 208, i.e., processable packets shown at 403 in FIG. 4 (step S607).

It should be noted that when receiving incoming packets during the return processing, the MAC 309 transmits the incoming packets to the RAM 202 through the first RxFIFO 304 and also transmits these packets to the second RxFIFO 306, as shown in FIG. 4.

Next, the CPU 201 performs response processing on incoming packets, which are stored in the RAM 202 and for which the response processing has not been made, i.e., unprocessable packets shown at 402 in FIG. 4 (step S608).

Figure 7:
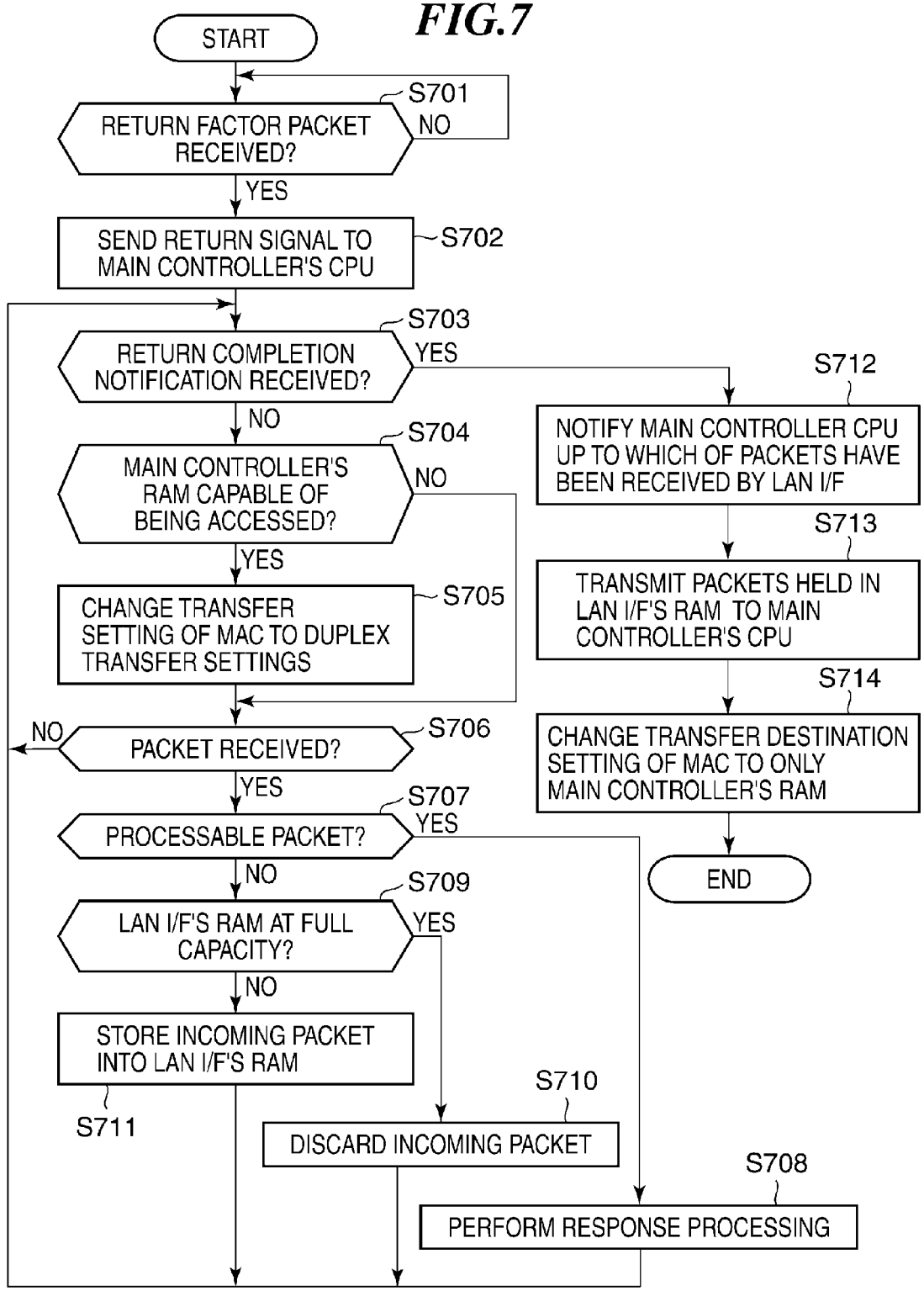
FIG. 7 is a flowchart showing operation of a microprocessor of the LAN I/F of the main controller performed when the power saving mode is returned to the normal power mode.

FIG. 7 shows, in flowchart, operation of the microprocessor 308 of the LAN I/F 208 of the main controller 101 performed when the power saving mode is returned to the normal power mode in the process sequence shown in FIG. 5.

Referring to FIG. 7, the microprocessor 308 determines whether or not the MAC 309 receives the return factor packet denoted at 401 in FIG. 4 (step S701). If the answer to step S701 is NO, the microprocessor 308 again performs the determination in step S701. If the LAN I/F 208 receives the return factor packet 401 (i.e., if YES to step S701), the microprocessor 308 sends to the power controller 218 of the main controller 101 a return signal (wake signal) representing that the power mode should be returned to the normal power mode (step S702).

Next, the microprocessor 308 determines whether or not it receives a return completion notification from the CPU 201 (step S703). When receiving no return completion notification (i.e., if NO to step S703), the microprocessor 308 checks whether or not the RAM 202 of the main controller is capable of being accessed (step S704). If a self-refresh state of the RAM 202 is canceled (see FIG. 5), the RAM 202 becomes capable of being accessed within a time period that is shorter than a time period required for the main controller 101 to return from the power saving mode.

If the RAM 202 is incapable of being accessed (i.e., if NO to step S704), the flow proceeds to step S706. On the other hand, if the RAM 202 is capable of being accessed (i.e., if YES to step S704), the microprocessor 308 changes the transfer setting of the MAC 309 to duplex transfer settings under which incoming packets are transferred by the MAC 309 to both the first and second RxFIFOs 304, 306 (step S705), whereupon the flow proceeds to step S706.

In step S706, the microprocessor 308 determines whether or not it receives an incoming packet. If the answer to step S706 is NO, the flow returns to step S703. On the other hand, when receiving an incoming packet (i.e., if YES to step S706), the microprocessor 308 determines whether or not the incoming packet is a processable packet on which response processing can be performed by the LAN I/F 208 (step S707).

If the incoming packet is a processable packet (i.e., if YES to step S707), the microprocessor 308 performs response processing on the incoming packet (step S708), whereupon the flow returns to step S703. On the other hand, if the incoming packet is an unprocessable packet (i.e., if NO to step S707), the microprocessor 308 determines whether or not the RAM 311 is at full capacity (step S709).

If the RAM 311 is at full capacity (i.e., if YES to step S709), the microprocessor 308 discards the incoming packet (step S710), whereupon the flow proceeds to step S703.

If it is determined that the RAM 311 is not at full capacity (i.e., if NO to step S709), the microprocessor 308 stores the incoming packet into the RAM 311 (step S711), whereupon the flow returns to step S703 in which whether or not the return completion notification is received from the CPU 201 is determined.

When receiving the return completion notification (i.e., if YES to step S703), the microprocessor 308 notifies the CPU 201 of information that represents how many packets have been received until that time by the LAN I/F 208, i.e., information that represents up to which of packets have been received until that time (step S712).

This notification does not individually indicate packets subjected to the response processing, but indicates up to which of packets have been received. For example, in the example shown in FIG. 4, the microprocessor 308 notifies the CPU 201 in step S712 that ten packets have been received until completion of return to the normal power mode. As for the first to tenth packets, responses to processable packets are performed by the microprocessor 308, whereas responses to unprocessable packets are performed by the CPU 201. Responses to the eleventh and subsequent packets are made by the CPU 201, irrespective of whether each packet is a processable packet or an unprocessable packet.

In a case that IDs can be assigned to respective packets, it is possible to notify the CPU 201 of the ID assigned to the packet lastly received until completion of return to the normal power mode. In that case, the CPU 201 responds to packets assigned with IDs subsequent to the ID of the lastly received packet.

In a case that a number of external equipment are network-connected to the information processing apparatus 100 so that network traffic is large, it is preferable, in order to perform responses to incoming packets at high speed, that the CPU 201 determines whether each of incoming packets received while the power mode is being returned to the normal power mode is a processable packet or an unprocessable packet and responds to unprocessable packets after the power mode is returned to the normal power mode.

Referring to FIG. 7 again, the microprocessor 308 transmits incoming packets held in the RAM 311 to the CPU 201 (step S713), cancels the duplex transfer settings, and changes the transfer setting of the MAC 309 to a third transfer setting such that the MAC 309 transfers the incoming packets to only the RAM 202 (step S714), whereupon the microprocessor 308 completes the processing in the power saving mode. The MAC 309 transfers the incoming packets to the main controller 101 that has returned to the normal power mode.

As described above, in a case that the RAM 202 becomes incapable of being accessed, incoming packets received while the operation for return to the normal power mode is being performed are retained in the RAM 311, and the retained incoming packets are transmitted to the CPU 201 after completion of the return operation. It is therefore possible to prevent occurrence of an incoming packet reception failure during the return operation.

Figure 8:
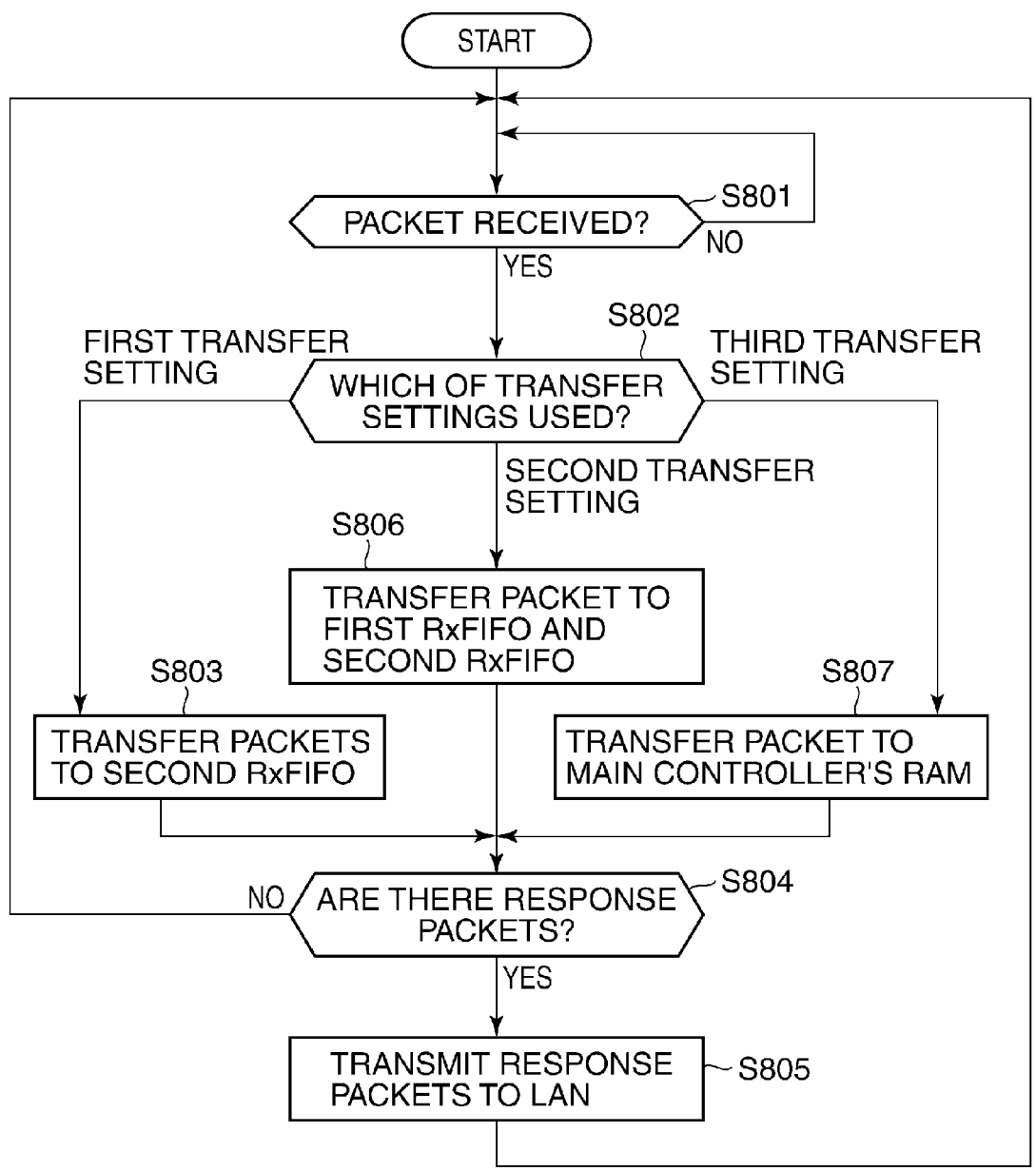
FIG. 8 is a flowchart showing a process performed by a MAC of the main controller when the power saving mode is returned to the normal power mode.

FIG. 8 shows, in flowchart, a process performed by the MAC 309 of the main controller 101 when the power saving mode is returned to the normal power mode.

Referring to FIG. 8, the MAC 309 determines whether or not it receives a packet after the main controller 101 shifts to the power saving mode (step S801). If the answer to step S801 is NO, the MAC 309 again determines in step S801 whether it receives a packet.

When receiving a packet (i.e., if YES to step S801), the MAC 309 changes a transfer destination of incoming packet in accordance with the transfer setting made by the microprocessor 308. In the present example, as the transfer setting, there are a first transfer setting under which an incoming packet is transferred to only the second RxFIFO 306, a second transfer setting (duplex transfer settings) under which an incoming packet is transferred to both the first and second RxFIFOs 304, 306 (first and second FIFOs), and a third transfer setting under which an incoming packet is transferred to only the first RxFIFO 304.

The microprocessor 308 sets the first transfer setting for the MAC 309 when the main controller 101 is in the power saving mode, sets the second transfer setting for the MAC 309 when the main controller 101 is performing the return operation and the RAM 202 is capable of being accessed, and sets the third transfer setting for the MAC 309 when the main controller 101 is in the normal power mode.

In step S802, the MAC 309 determines which of the first, second, and third transfer settings is used as the transfer setting. When determining in step S802 that the first transfer setting is used as the transfer setting (i.e., the main controller 101 is in the power saving mode), the MAC 309 transfers incoming packets to the second RxFIFO 306 until it receives the return factor packet (step S803). The incoming packets are set into the second RxFIFO 306, and response processing is performed by the microprocessor 308. Subsequently, response packets are stored into the second TxFIFO 307.

Next, the MAC 309 determines whether or not there is one or more response packets (step S804). If there is no response packet (i.e., if NO to step S804), the flow returns to step S801. If there is one or more response packets (i.e., if YES to step S804), the MAC 309 transmits the one or more response packets to the LAN 106 through the PHY 310 (step S805), whereupon the flow returns to step S801.

When determining in step S802 that the second transfer setting is used as the transfer setting (i.e. the return processing is being performed and the RAM 202 is capable of being accessed), the MAC 309 transfers the incoming packet to the first RxFIFO 304 and to the second RxFIFO 306 (step S806). The incoming packet is set into both the first and second RxFIFOs 304, 306. As previously described, the incoming packet stored in the first RxFIFO 304 is DMA-transferred to the RAM 202 through the I/F unit 301. Subsequently, the flow proceeds to step S804 where the MAC 309 determines whether or not there is one or more response packets.

When determining in step S802 that the third transfer setting is used as the transfer setting (i.e., the main controller 101 is in the normal power mode), the MAC 309 transfers the incoming packet to the RAM 202 (step S807). The incoming packet is set into the first RxFIFO 304, and response processing is performed by the CPU 201. Subsequently, the flow proceeds to step S804 where the MAC 309 determines whether or not there is one or more response packets.

If the RAM 311 of the LAN I/F 208 is at full capacity, unprocessable packets to which the LAN I/F 208 has not responded are discarded in step S710 of FIG. 7, but response processing on unprocessable packets transferred to the RAM 202 as described for step S806 is performed by the CPU 201 in step S608 of FIG. 6 after the main controller 101 is returned to the normal power mode. It is therefore possible to prevent occurrence of an incoming packet reception failure during the return operation.

As described above, responses to incoming packets can be made even during execution of the return processing, as in the power saving mode, and a reception failure for incoming packets to which responses cannot be made until the power mode is returned to the normal power mode (among packets received during execution of return processing) can be prevented from occurring.

Furthermore, incoming packets held in the RAM 202 during the return processing are deleted, if the response processing on these packets has been made by the LAN I/F 208. It is therefore possible to prevent the response processing on the incoming packets to which responses have been made from being performed again.

As apparent from the foregoing description, the CPU 201 and the RAM 202 function as a first generation unit for generating response information. It should be noted that the first generation unit and the following units are defined in the appended claims. The microprocessor 308, the second RxFIFO 306, and the RAM 311 function as a second generation unit for generating response information. The MAC 309, the first RxFIFO 304, and the I/F unit 301 function as a transfer control unit for transferring reception information. The second RxFIFO 306 and the RAM 311 function as a second storage unit (second memory) for storing reception information. The PHY 310 functions as a reception unit for receiving reception information from external equipment.

(Other Embodiments)

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2011-012239, filed Jan. 24, 2011, which is hereby incorporated by reference herein in its entirety.

What is claimed is:

1. An information processing apparatus comprising:
a first controller configured to perform response processing on received packets in a case where the information apparatus operates in a first power mode; and
a second controller configured to perform response processing on received packets in a case where the information processing apparatus operates in a second power mode in which the first controller is incapable of performing the response processing;
wherein the second controller notifies to the first controller a return instruction of allowing the information processing apparatus to return to the first power mode in a case where the information processing apparatus operates in the second power mode and receives a predetermined packet to which the second controller is incapable of performing the response processing with the second power mode maintained,
the first controller performs return processing of allowing the information processing apparatus to return to the first power mode in a case where the first controller receives the return instruction from the second controller,
the first controller notifies to the second controller a completion notification representing completion of the return processing in a case where the return processing is completed, and
the second controller performs the response processing on the received packets after the second controller has notified the return instruction to the first controller until the second controller receives the completion notification, wherein the received packets are transferred to both the first controller and the second controller after the second controller has notified the return instruction to the first controller until the second controller receives the completion notification.

2. The information processing apparatus according to claim 1, wherein the first controller performs the response processing on packets, for which the response processing has not been made by the second controller, from among the packets transferred to the first controller, after the return processing is completed.

3. The information processing apparatus according to claim 2, wherein the second controller performs the response processing on the packets received by the second controller after the second controller has notified the return instruction to the first controller until the second controller receives the completion notification, and the second controller notifies to the first controller a specified information through which the first controller specifies first packets, for which the response processing has been made by the second controller, after the return processing is completed, and the first controller specifies second packets, for which the response processing has not been made by the second controller, and performs the response processing on the specified second packets, after the return processing is completed.

4. The information processing apparatus according to claim 1, wherein the second controller is a LAN/IF.

5. The information processing apparatus according to claim 1, wherein the information processing apparatus comprises a printing apparatus including the first controller and the second controller.

* * * * *